May 1, 1934.    R. WARE    1,956,886
PISTON ROD FOR RADIAL ENGINES
Filed June 23, 1933
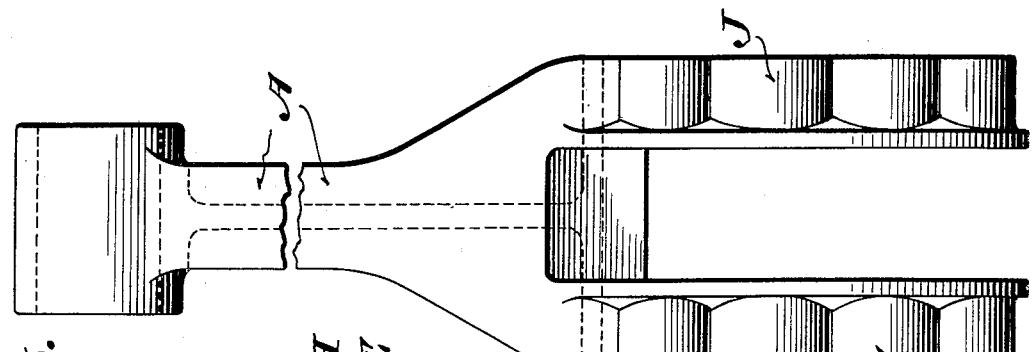
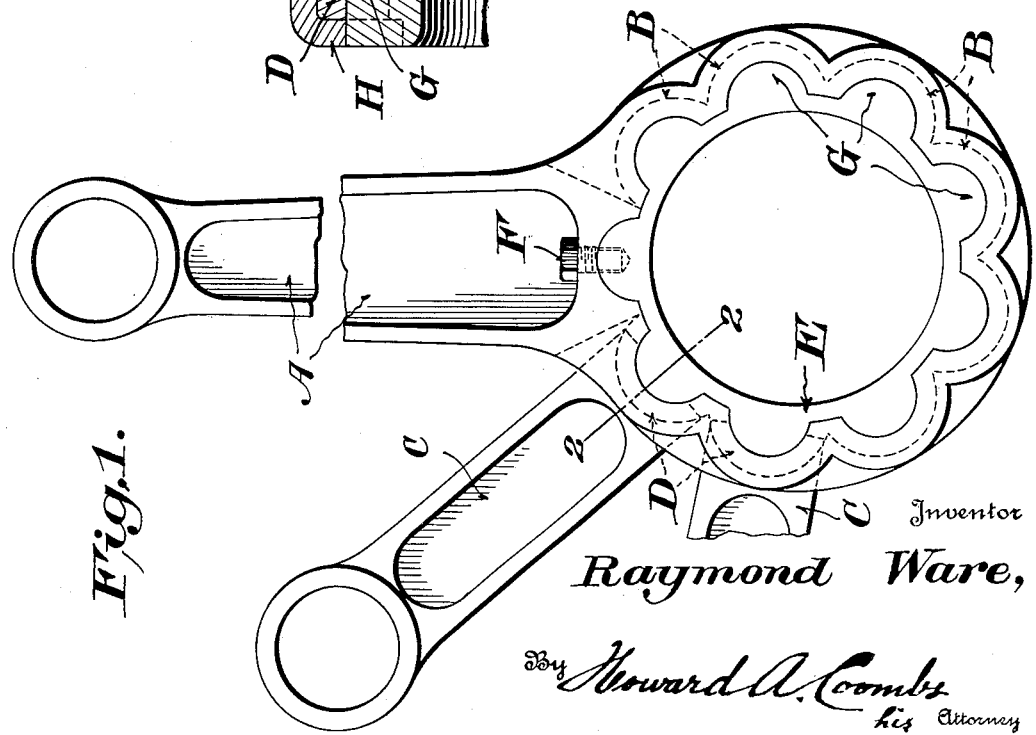
Inventor
Raymond Ware,
By Howard A. Coombs
his Attorney Patented May 1, 1934

1,956,886

UNITED STATES PATENT OFFICE 1,956,886

PISTON ROD FOR RADIAL ENGINES

Raymond Ware, Hamilton, N. Y.

Application June 23, 1933, Serial No. 677,301

4 Claims. (Cl. 74—17)

This invention relates to piston rods for radial engines, such as are now used on aircraft, and resides particularly in an improved construction of the master rod big end and the pivotal connection of the link rods therewith.

The object of the new construction is to decrease the offset or eccentric loading of the master rod big end by the link rods, which is due to the thrust and pull of said link rods not passing through the axis of the crank pin. In the usual master and link rod construction, this unbalanced force and the varying rate of piston acceleration in the link rod cylinders are the cause of practically all the vibration set up in the operation of the engine.

In the conventional construction, the master rod has to be massive to resist the added bending moment caused by this eccentric loading and which is taken up by the big or crank pin end of said rod to which the link rods are pinned. These pins, called knuckle pins, are usually secured at their ends in annular flanges integral with the master rod big end, and the ends of the link rods are pivoted on said pins. With the solid big end construction, now in general use in single row radial engines, it is customary to space the knuckle pin centers at equal distances apart. In the case of a nine cylinder engine, any two adjacent knuckle pin centers make an angle of 40° with the crank pin center. It is evident that, if these knuckle pin centers could be moved nearer to the crank pin center, the eccentric loading would be reduced. The magnitude of the eccentric loading of the master rod big end by the link rods depends upon the ratio of the radius of the circle of knuckle pin centers to the length of the link rods. Therefore, if it were possible to move the knuckle pin centers 35% nearer to the crank pin center, it would result in reducing the moment arm by about 40%, which means a 40% reduction in the bending moment acting on the master rod and caused by the off-center action of the link rods. However, this is not possible with the present knuckle pin construction. The present invention provides a practical construction by which this desirable result is attained. It is illustrated in the drawing, in which, Fig. 1 is a front elevation of the master rod, showing the connection of the link rods thereto.

Fig. 2 is a section on the line 2—2 of Fig. 1.

Fig. 3 is a side elevation of the master rod, and

Fig. 4 is an end view of the crank pin bushing.

As shown in the drawing, provision is made for 8 link rods, the invention being, in this instance, applied to a nine cylinder engine. At intervals of 40°, semi-cylindrical recesses B are milled in the inner faces of the cheeks J of the bifurcated end of the master rod A, the axes of said recesses running parallel to the crank pin axis. The inner end of each of the link rods C has lateral extensions D of conjugate shape to fit within said recesses. The crank pin bushing E has semi-cylindrical projections G on its periphery, which fit within the concave ends of the link rods and their extensions. The ninth projection G on the bushing, which may or may not be of the same shape as the other eight projections, fits within a conjugate recess in the center of the master rod and is secured against longitudinal displacement by the bolt F. The outer circumferential edges of the master rod big end are flanged inwardly at H, Fig. 2, to make a snug fit over the outer surface of the bushing E at its ends, the bushing thus being securely locked in the master rod big end against rotation or radial movement. The axes of the projections G of the bushing coincide with the axes of the recesses B in the forked end of the master rod, about which axes the link rods pivot.

The link rods are assembled on the master rod big end by inserting their lateral extensions D into the space between the forked ends of the master rod parallel to the said space, and then turning them through 90° and locating them in the desired recess B. It facilitates the operation if the rods on each side of the master rod are first placed in position and then those on either side alternately, until the two link rods at the lower end remain to be inserted in the fork. The two sets of three link rods each, on either side of the master rod, are then moved as close to the master rod shank as possible, so as to leave the maximum space at the lower end of the fork for the insertion of the last two link rods. One of these can now be inserted in the opening by "hooking" the extension D on one side through the opening and moving the rod as far as possible to one side. Then the other extension D is inserted in the opening and the rod is turned through 90° as before. To insert the last link rod, both sets of rods on either side of the remaining open space must be swung as far as possible to their respective sides to secure the maximum length of opening. As described above in connection with the insertion of the last link rod but one, the extension D on one side of the last rod must be "hooked" into the opening and the rod be moved as far as possible to one side to permit the extension on the opposite side to pass through the remaining space, whereupon the rod is turned through 90° and the extensions D are brought into their proper recesses B. When all the link rods have been thus introduced and located in the big end of the master rod, the bushing E is inserted and locked in place by the bolt F. The assembly is now ready to be mounted on the free end of the crank pin, as will be readily understood by those skilled in the art.

By this new construction, the circle of link rod pivotal centers is much reduced in diameter, whereby the unbalanced forces, exerted by said rods on the master rod, are likewise reduced by upwards of 40%. This means that the additional bending moment, caused by these forces and acting on the master rod, is reduced by a like amount, which permits the use of a much lighter master rod, both in the shank and in the big end, and this, in turn, means lighter counter-weights on the crank arms. Due to the reduced over-all diameter of the big end, as compared with the usual construction, the engine cylinders can extend further into the crank case without interference with the big end; the master and link rods can be shorter and the over-all diameter of the engine be reduced, resulting in a considerable reduction in its weight and frontal area, thus diminishing the air resistance in flight. The additional piston side thrust in the master rod cylinder, due to these forces, is reduced by, at least, 40%, which is a material improvement, as it is this piston which is most likely to cause trouble by scoring or seizure. All the advantages just mentioned are in addition to the material reduction in vibration.

It will be obvious that the construction described and constituting my invention is applicable to radial engines having various numbers of cylinders, as two, three, five or seven, operating on a single crank throw.

Having thus described my invention, what I claim is:

1. In a radial engine, a master rod having a bifurcated big end in the inner faces of which are a plurality of semi-cylindrical recesses; link rods having semi-cylindrical extensions on their ends fitting within said recesses, and a crank pin bushing fitted within the master rod big end and having semi-cylindrical projections fitting in the said extensions.

2. In a radial engine, a master rod having a bifurcated big end provided with recesses constituting bearing surfaces, link rods having lateral extensions fitting within said recesses, and a crank pin bushing secured in said big end and having semi-cylindrical projections constituting bearing surfaces for said extensions.

3. A radial engine master rod having its big end bifurcated and provided with internal semi-cylindrical recesses to form external bearing surfaces for the link rod ends, and a crank pin bushing fitted in said big end and having peripheral semi-cylindrical projections to form internal bearing surfaces for said link rod ends.

4. In a radial engine, a master rod having a bifurcated big end provided with semi-cylindrical recesses in the inner faces of its arms to constitute external bearings for the ends of the link rods, a crank pin bushing fitted in said big end and having semi-cylindrical projections to constitute internal bearings for said link rod ends, and inwardly extending flanges on the outer circumferential edges of said arms to fit over the outer surface of said bushing.

RAYMOND WARE.